Aug. 20, 1946.  D. G. GREW  2,406,013

TOPPER FOR BEETS AND THE LIKE

Filed Sept. 25, 1943

INVENTOR
DOLPHIS.G.GREW.
BY
George B. Willcox.
ATTORNEY

Patented Aug. 20, 1946

2,406,013

UNITED STATES PATENT OFFICE 2,406,013

TOPPER FOR BEETS AND THE LIKE

Dolphis G. Grew, Saginaw, Mich.

Application September 25, 1943, Serial No. 503,736

3 Claims. (Cl. 55—107)

This invention relates to apparatus for topping or removing leaves and stems from sugar beets or other vegetables or roots before being lifted; also for destroying weeds that sprout between the rows early in the growing season.

My invention provides an effective, inexpensive double purpose device, for both weeding and topping.

A result attained by its use as a beet topper is: removal of leaves, stems, and the low-grade portion of the beet caps without wasting commercially good root substance.

Another desired result is to disintegrate the leaves, the stems, and the worthless portions of the beet caps, dispersing the fragments over the ground between the rows, as a mulch or fertilizer.

Another object is to provide such an implement with flexible characteristics that render it capable of adapting itself to top all beets of a row substantially alike, even though some may project high above the ground, while others in the same row are below the surface.

A further object is to provide a self-clearing topping element constructed so that it shall keep itself free from accumulations of leaf and root material and dirt. It is adapted to be mounted on a conventional tractor as auxiliary equipment, and can be easily attached or removed. It is not likely to break or become dulled by contact with stones, as do cutting disks and knives when fixed diagonally across the row so as to cut by advancing edgewise along the ground.

An additional object of my invention, besides topping, is to kill weeds in the early stage of sprouting, scattering the disintegrated material over the ground as above described, and also pulverizing a portion of the surface soil.

The results and objects above mentioned and certain others set forth in the specification are attained by a combination of devices and the equivalents thereof described and claimed herein as typical embodiments of my invention.

Referring to the accompanying drawing which illustrates a preferred embodiment of my claimed invention;

Figure 1:
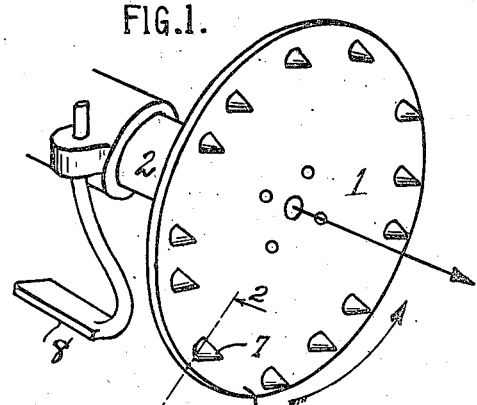
Fig. 1 is a perspective view of the rotor with disintegrating abutments or strikers thereon and a shoe for supporting the rotor at working height during its advancing movement.
Figures 9, 10, 11:
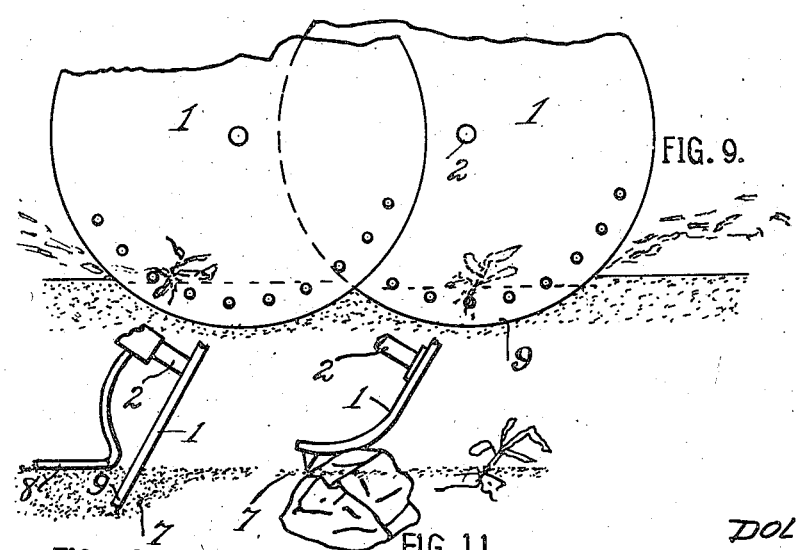

Figs. 5 to 8, inclusive, are diagrammatic side views of the rotor disk, showing the positions it occupies when engaging and passing over beets that project different heights above the ground in the same row;

Fig. 9 is a fragmentary diagrammatic face view, showing two disks in overlapping arrangement suitable for destroying weeds, and at the same time cultivating the surface of the ground;

Fig. 10 is a diagrammatic fragmentary edge view of a rotor showing its bottom periphery arranged to make a trough-like path in the ground while advancing in the manner indicated in Fig. 1; and Fig. 11 is a similar fragmentary view, showing how a greater flexing action is caused when encountering and passing over a stone in the ground.

The foregoing views illustrate the structure and novel mode of operation of my improved rotor when used for topping sugar beets under various conditions, and also for destroying weeds.

Figure 4:
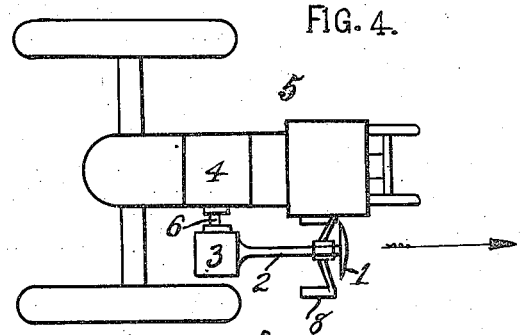
Fig. 4 is a diagrammatic plan view of a tractor with a topper of my invention mounted thereon.

The beet topping element consists primarily of a disk-like rotor 1 mounted on a suitable spindle 2, the other end of which is operatively connected, Fig. 4, by a transmission 3 to a power source 4 on a tractor or other vehicle 5. The connection 6 between transmission 3 and power source 4 is pivotal so disk 1 can rise or lower relatively to the tractor 5 as it moves along the row of beets, following the contour of the ground.

Figures 2, 3:
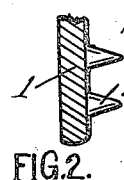
Fig. 2 is an enlarged fragmentary section, taken approximately on the radial line 2—2 of Fig. 1, showing, as a modification of my invention, a double row of disintegrating abutments, made integral with the disk.
Fig. 3 is a view similar to Fig. 2, showing screws as abutment structures applied to a laminated disk.
Figures 5, 6, 7, 8:
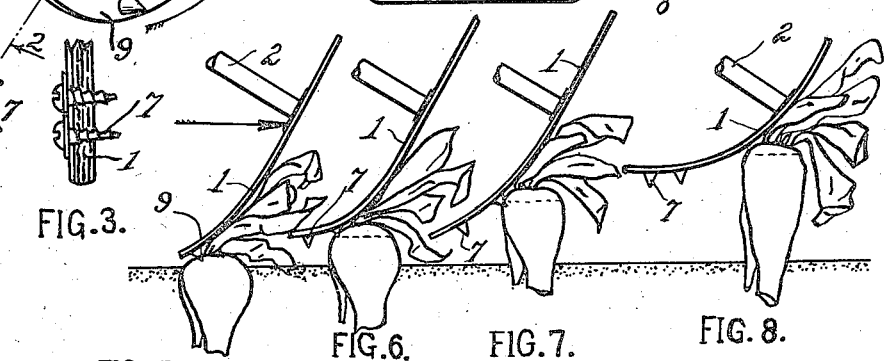

The advancing face of the rotor, Fig. 1, is equipped with forwardly projecting short teeth or strikers 7. Preferably the projections or strikers 7 are arranged adjacent the rim portion of the disk. They may be in one or more circular rows, as indicated in Figs. 1, 2, 3, and may be spaced from each other symmetrically or otherwise. Their function is to disintegrate the leaves and stems, together with only that portion of the substance of each beet cap which is intended to be removed, as will now be described.

In use, rotor 1 is supported by shoes 8 or equivalent devices that travel upon the surface of the ground, as is indicated in Fig. 10, their purpose being to keep the peripheral bottom edge portion 9 of the disk 1 from cutting too deeply into the ground.

Shoes 8 and disk 1 travel steadily along the row of beets as a unit, being undisturbed by swaying and up-and-down movements of the vehicle 5, due to pivotal connection 6. The rotor is adapted to travel in the direction of its own axis, Figs. 1 and 4, being propelled by the vehicle 5 and rotated by power means 4 on the vehicle.

Flexibility is a characteristic feature of the disk 1. It should be readily pliant and supple or somewhat floppy but need not necessarily be springy, elastic, or resilient.

Preferably, the ability of the disk 1 to flex is made greater near the periphery than near the axis of rotation.

A satisfactory disk structure may comprise several plies of canvas and rubber, or plastic or like material, built up as indicated in Fig. 3.

I have found in practice that for the purpose of topping sugar beets the disk may be, say, 20 inches in diameter, with teeth or strikers 7 that project about one-fourth inch to one inch from the advancing face, depending somewhat upon the amount of cap to be removed. The strikers 7 may be formed in one piece with the disk body 1, as shown in Fig. 2, or they may be in the form of inserted screws or the like, as in Fig. 3. They are arranged in preferably one or two substantially circular rows adjacent the rim portion only of the disk 1.

When rotating at appropriate speed the flexible disk 1 tends to hold to its normal working position in a plane perpendicular to its axis.

However, if the lower part of the disk rim encounters an obstruction, such as a bunch of beets, stems, and leaves, while advancing along the row of beets, then the lower rim portion 9 and also, if the obstruction is a high one, the portions nearer the center of the disk in the vicinity of numeral 1 will bend backward pliantly, and wipe over the obstruction.

But as soon as the rotating disk passes the obstruction and the lower rim portion again is free the normal plane of rotation is assumed automatically, due to centrifugal action.

If the obstruction encountered is a beet cap and foliage, as illustrated in Figs. 5 to 8, the lower rim portion of the yielding disk goes over the beet cap with a flap-like wiping action and swift lateral movement due to the rotation of the disk. The extent to which it is flexed by the beet depends upon the height of the beet cap from the ground. A high projecting beet, Fig. 8, will be engaged by the smooth face portion of the disk nearer the center of rotation and will be flexed there considerably, as shown, near numeral 1, and so will press and wipe the stems and leaves down flatwise before they are overridden by the strikers 7 while a beet cap close to the surface, Fig. 5, will cause only a small degree of flexing at 1 and greater flexing, accompanied by disintegrating at 9. The flexible character of the disk makes the rotor 1 self-adapting, that is to say it can top all beets in a row even if they are of various heights, as will now be explained, reference being had to Figs. 5 to 8, inclusive.

The rotor passes with equal facility over beet caps that project only slightly above the ground, and those caps that project higher.

The strikers 7 operate on all beets alike, after they have been flattened down by the smooth central portion of the disk, with a tearing and rapsing movement that is far superior in practice to the cutting and slicing actions heretofore generally employed to top beets mechanically. Thus, loss of good material due to wastefully and inaccurately knifing beet caps at different heights with earlier mechanically adjustable cutters is avoided.

The beet caps are prevented from being cut too deeply. Since the elements 7 project only a short distance in front of the face of disk 1 they can remove the beet cap material to only a certain depth while rotating at a given speed.

Disk face 1 acts as a gauge or guard plate that prevents cutting too deeply into the beet substance, so, at a given disk speed, regardless of the height of the beet above the ground, there is no danger of cutting off more of the cap than that portion intended to be destroyed.

When the rotor is driven at a good working rim speed, say, three to four thousand feet per minute, the strikers, 7, have ample velocity and penetrating force to destroy, disintegrate, and disperse beet stems, leaves and cap material while the machine 5 moves forward at a convenient rate, but the central area of the disk, being smooth, that is, having no strikers, does no disintegrating, but presses down the leaves preparatory to the tearing action of the strikers 7.

To sum up, my improved topping device utilizes the centrifugal force produced by rotation of the flexible disk to normally constrain the disk to a plane of rotation perpendicular to its axis. The inner portion of the revolving disk surface, in the vicinity of numeral 1, first comes into contact with the beet leaves and stems, bending them over as the disk moves forward, as shown in Figs. 5, 6, 7, 8. The foliage thus bent is in position to be shredded by the rapidly whirling projecting prongs or strikers 7 while the rim portion 9 of the disk wipes and whirls over the beet cap.

During such shredding operation centrifugal force keeps the swiftly rotating strikers 7 yieldingly pressed downwardly toward the beet cap so particles of leaves, stems, and tops sheared off by the strikers are thrown clear of the row of beets.

For the purpose of destroying weeds between rows of beets during the early part of the growing season a single disk may be used as in Fig. 1, or two or more disks, 1, 1, may be situated in overlapping arrangement as shown in Fig. 9, being moved forward together and rotated simultaneously.

The lower rim 9 of disk 1 projects into the ground, say, from one-half to one inch, Fig. 10, and the projections 7 act to clear away loose surface dirt, pebbles, etc. and to destroy the foliage and roots of the weeds. If a stone is encountered, as shown in Fig. 11, the disk 1 will flex backwardly and wipe over the surface of the stone, then resume its planar position to continue weed destruction, as indicated.

From the foregoing it will be seen that the rotor with strikers 7 disintegrates weeds and scatters the pieces laterally away from the path of advance of the rotor; also, a small amount of the surface dirt will be thrown to one side, as indicated in Fig. 9.

The rotor 1 is self-clearing, that is, it keeps itself free from mud, dirt or other accumulations that otherwise might clog it. Its self-clearing feature is apparent from inspection of Fig. 1, where it will be seen that the short projections 7 on the flat face of the disk offer but little opportunity for accumulating dirt. The flexibility of the disk with its rim yielding back and forth, when running at working speed, tends to dislodge any dirt accumulation, and the force produced by the rapid rotation of the disk throws it free so that no matter how sticky or adhesive the soil may be the rotor can not fill up, but instead the members 7 are always clear and capable of exerting their maximum disintegrating effect whenever a beet or a weed is encountered.

In the operation of topping no vertical adjustment of the rotor 1 or spindle 2 is necessary in order to top uniformly a row of short and tall beets; because the rotor 1 flexes to suit all ordinary conditions of use, without any vertical adjustment of the shoe 8 relatively to the axis of disk 1.

Having thus described my invention, what I claim and desire to secure by Letters Patent is:

1. In a device for topping beets and the like, a vehicle transportable along a row of beets, a rotor comprising a flexible disk, a spindle for said disk having pivotal connection to the vehicle and extending substantially in the line of travel of the vehicle, power means on said vehicle for rotating the disk at speed appropriate to normally maintain the rim portion of the disk in a plane perpendicular to its axis of rotation; a portion of the work-engaging face of said disk adjacent the center of rotation presenting an unobstructed surface adapted to contact and bend down the stem and leaf portions of the beets in said row; the outer rim portion of said disk being adapted to flex rearwardly from said normal plane and to pass with wiping and rotary action over and in contact with the foliage and caps of successive beets in said row; striker elements disposed on the work-engaging face of such outer rim portion only, projecting forwardly therefrom in circularly spaced relation; and depth-limiting devices supporting said rotor in predetermined relation to the ground surface.

2. In a device for topping beets and the like, a vehicle transportable along a row of beets, a flexible disk-shaped rotor mounted thereon with its axis extending substantially in the direction of travel of the vehicle and pivotally connected thereto; power means for revolving the rotor; striker members arranged on the work-engaging face of the rotor adjacent the outer rim portion only thereof; said strikers being situated in peripherally spaced relation to each other and projecting beyond said work-engaging face.

3. A rotor for beet toppers, weeders and the like comprising a flexible pliant disk rotatable in its own plane at speed appropriate to normally maintain by centrifugal action the rim portion of the disk in a plane perpendicular to its axis of rotation; and strikers projecting outwardly from the work-engaging face of the disk near its periphery only, said strikers being spaced apart in circular arrangement.

DOLPHIS G. GREW.